US012615229B2

(12) United States Patent
Bergman et al.

(10) Patent No.: US 12,615,229 B2
(45) Date of Patent: Apr. 28, 2026

(54) DATA-DRIVEN NETWORKING TECHNIQUES

(71) Applicant: Analog Devices International Unlimited Company, Limerick (IE)

(72) Inventors: Rob C. Bergman, Breda (NL); Andreas Koch, Wiesbaden (DE); Joachim Preissner, Bad Toelz (DE); Aidan Frost, Edinburgh (GB); Jayapal Nadalla, Chittoor (IN); Ralph Patrick McCormick, Haverhill, MA (US)

(73) Assignee: Analog Devices International Unlimited Company, Limerick (IE)

( * ) Notice: Subject to any disclaimer, the term of this patent is extended or adjusted under 35 U.S.C. 154(b) by 92 days.

(21) Appl. No.: 18/608,380

(22) Filed: Mar. 18, 2024

(65) Prior Publication Data

US 2025/0294000 A1 Sep. 18, 2025

(51) Int. Cl.
| | |
|---|---|
| *G06F 15/16* | (2006.01) |
| *H04L 51/07* | (2022.01) |
| *H04L 51/21* | (2022.01) |

(52) U.S. Cl.
CPC .............. H04L 51/21 (2022.05); H04L 51/07 (2022.05)

(58) Field of Classification Search
CPC ................................. H04L 51/21; H04L 51/07
USPC ......................................................... 709/206
See application file for complete search history.

(56) References Cited

U.S. PATENT DOCUMENTS

| | | | | |
|---|---|---|---|---|
| 7,269,138 B2 * | 9/2007 | Huang | ................... | H04W 28/06 |
| | | | | 370/231 |
| 7,962,458 B2 * | 6/2011 | Holenstein | ............ | G06F 16/273 |
| | | | | 707/704 |
| 8,065,420 B2 * | 11/2011 | Akashika | .............. | H04L 9/3234 |
| | | | | 709/227 |
| 8,301,593 B2 * | 10/2012 | Hoffmann | ........... | G06F 11/2094 |
| | | | | 707/658 |
| 8,908,566 B2 * | 12/2014 | Nakamura | .............. | H04L 12/42 |
| | | | | 370/452 |

(Continued)

OTHER PUBLICATIONS

"KNX," Wikipedia, The Free Encyclopedia, Feb. 10, 2024, <http://en.wikipedia.org/wiki/KNX> [retrieved Mar. 6, 2024], 7 pages.

*Primary Examiner* — Alicia Baturay
(74) *Attorney, Agent, or Firm* — DLA Piper LLP (US)

(57) ABSTRACT

In some embodiments, a computer-implemented method of communicating on a shared medium is provided. A node computing device receives an incoming message via the shared medium and determines, based on the incoming message, whether the node computing device is the next computing device assigned to transmit on the shared medium. In response to determining that the node computing device is the next computing device assigned to transmit via the shared medium, the node computing device detects an end of the incoming message, and, in response, transmits an outgoing message via the shared medium. In some embodiments, a computer-implemented method of managing communication between node computing devices is provided. A maestro computing device transmits one or more configuration messages to establish a transmission order for the set of node computing devices to transmit messages on the shared medium, and transmits a start message that initiates the transmission order.

19 Claims, 14 Drawing Sheets

(56) References Cited

U.S. PATENT DOCUMENTS

| | | | | |
|---|---|---|---|---|
| 9,395,723 | B2 * | 7/2016 | Pari | G05D 1/028 |
| 9,641,432 | B2 * | 5/2017 | Jha | H04L 69/162 |
| 10,333,843 | B2 * | 6/2019 | Jha | H04L 45/302 |
| 10,812,380 | B2 * | 10/2020 | Jha | H04L 69/165 |
| 11,470,000 | B2 * | 10/2022 | Jha | G16H 40/67 |
| 11,695,554 | B2 * | 7/2023 | Robertson | H04L 63/0442 |
| | | | | 380/285 |
| 11,750,594 | B2 * | 9/2023 | Vangati | H04W 4/12 |
| | | | | 713/175 |
| 11,882,111 | B2 * | 1/2024 | Vangati | H04W 12/08 |
| 12,047,292 | B2 * | 7/2024 | Jha | H04L 45/74 |
| 12,143,484 | B2 * | 11/2024 | Robertson | H04L 63/0442 |
| 12,206,660 | B2 * | 1/2025 | Vangati | H04W 4/33 |

* cited by examiner

106

102

306   CONFIGURATION ENGINE

308   TRANSMISSION ORDER MANAGEMENT ENGINE

304   PHYSICAL LAYER INTERFACE

MAESTRO COMPUTING DEVICE

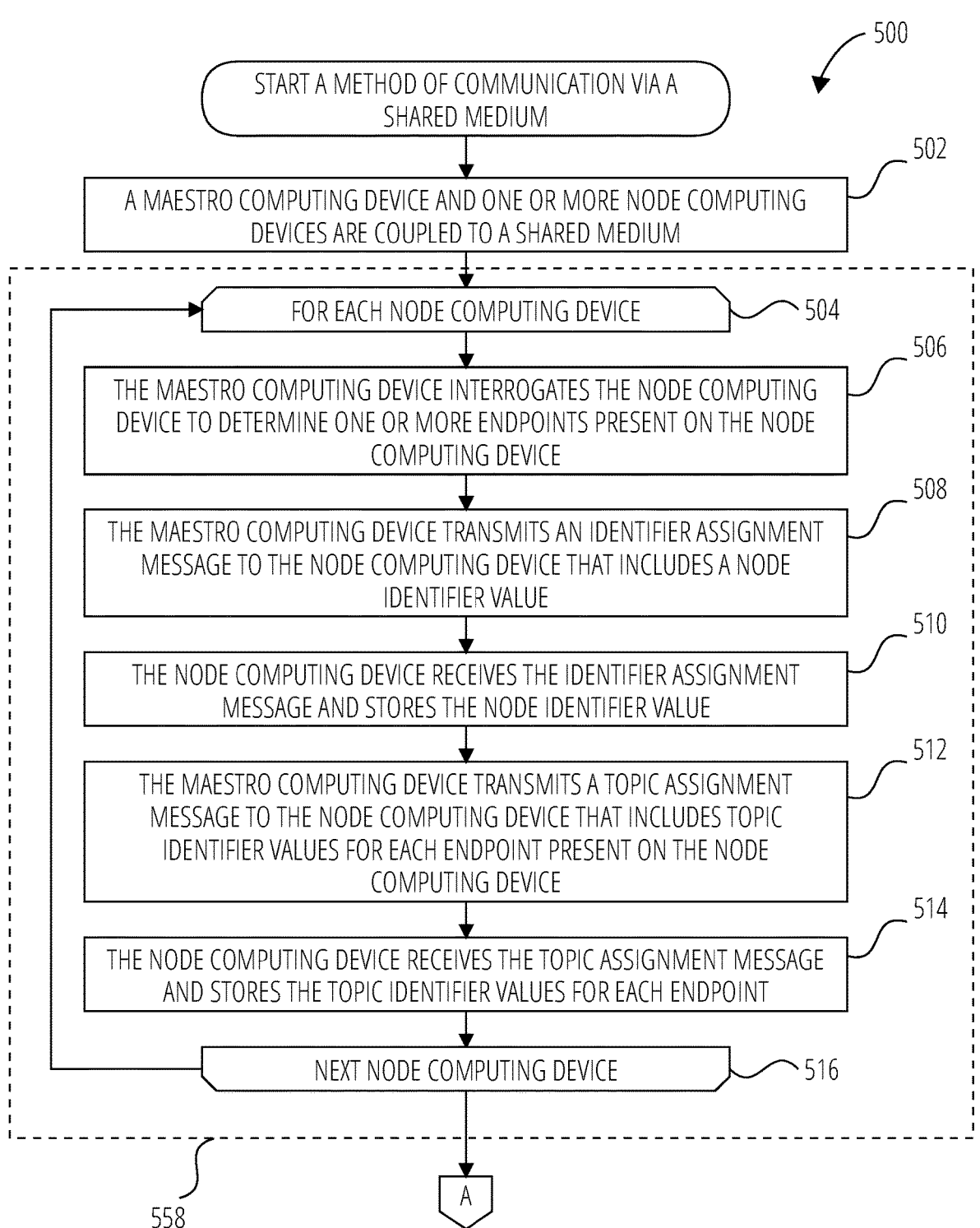

START A METHOD OF COMMUNICATION VIA A
SHARED MEDIUM

A MAESTRO COMPUTING DEVICE AND ONE OR MORE NODE COMPUTING
DEVICES ARE COUPLED TO A SHARED MEDIUM

FOR EACH NODE COMPUTING DEVICE

THE MAESTRO COMPUTING DEVICE INTERROGATES THE NODE COMPUTING
DEVICE TO DETERMINE ONE OR MORE ENDPOINTS PRESENT ON THE NODE
COMPUTING DEVICE

THE MAESTRO COMPUTING DEVICE TRANSMITS AN IDENTIFIER ASSIGNMENT
MESSAGE TO THE NODE COMPUTING DEVICE THAT INCLUDES A NODE
IDENTIFIER VALUE

THE NODE COMPUTING DEVICE RECEIVES THE IDENTIFIER ASSIGNMENT
MESSAGE AND STORES THE NODE IDENTIFIER VALUE

THE MAESTRO COMPUTING DEVICE TRANSMITS A TOPIC ASSIGNMENT
MESSAGE TO THE NODE COMPUTING DEVICE THAT INCLUDES TOPIC
IDENTIFIER VALUES FOR EACH ENDPOINT PRESENT ON THE NODE
COMPUTING DEVICE

THE NODE COMPUTING DEVICE RECEIVES THE TOPIC ASSIGNMENT MESSAGE
AND STORES THE TOPIC IDENTIFIER VALUES FOR EACH ENDPOINT

NEXT NODE COMPUTING DEVICE

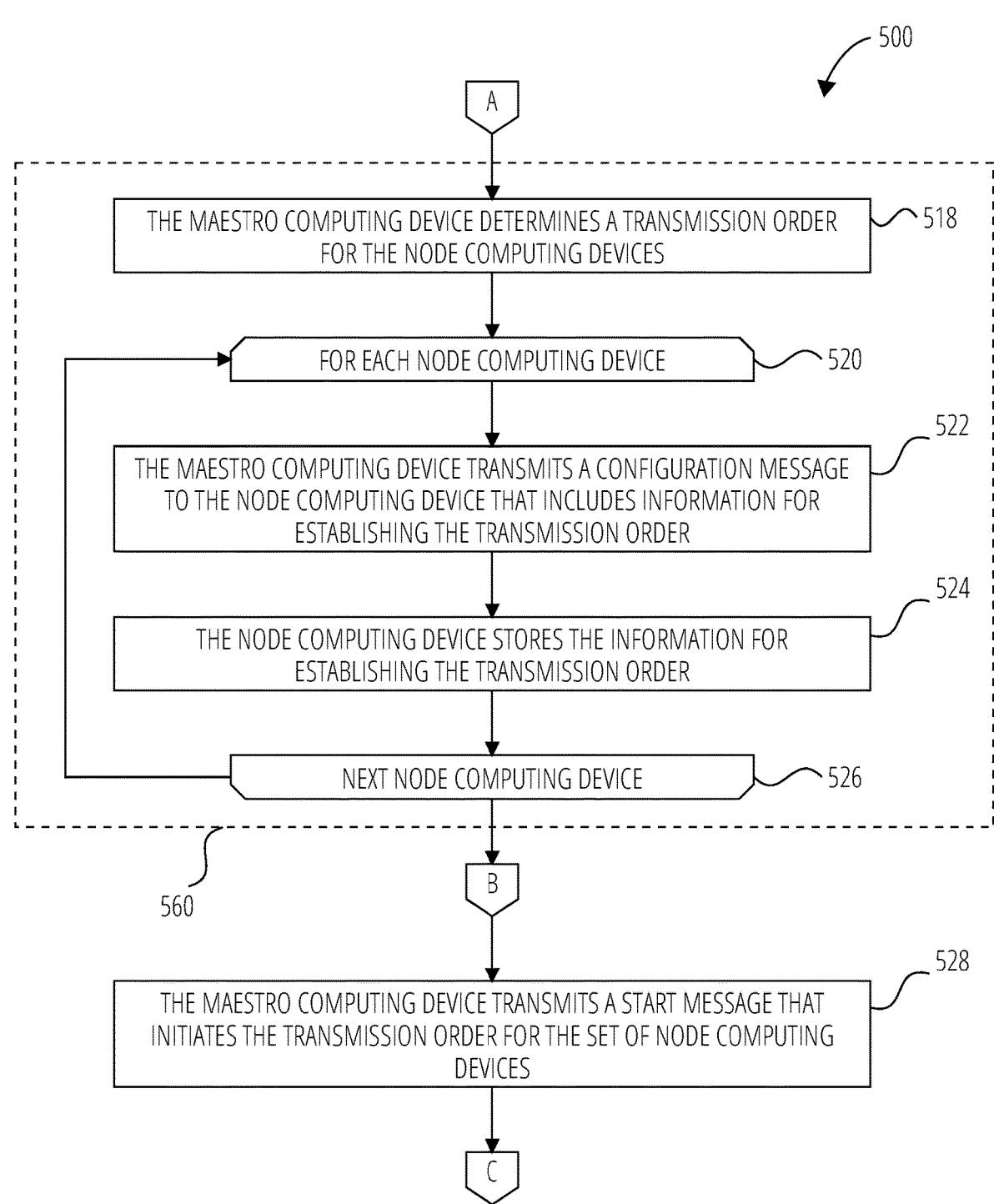

500

A

THE MAESTRO COMPUTING DEVICE DETERMINES A TRANSMISSION ORDER FOR THE NODE COMPUTING DEVICES — 518

FOR EACH NODE COMPUTING DEVICE — 520

THE MAESTRO COMPUTING DEVICE TRANSMITS A CONFIGURATION MESSAGE TO THE NODE COMPUTING DEVICE THAT INCLUDES INFORMATION FOR ESTABLISHING THE TRANSMISSION ORDER — 522

THE NODE COMPUTING DEVICE STORES THE INFORMATION FOR ESTABLISHING THE TRANSMISSION ORDER — 524

NEXT NODE COMPUTING DEVICE — 526

560

B

THE MAESTRO COMPUTING DEVICE TRANSMITS A START MESSAGE THAT INITIATES THE TRANSMISSION ORDER FOR THE SET OF NODE COMPUTING DEVICES — 528

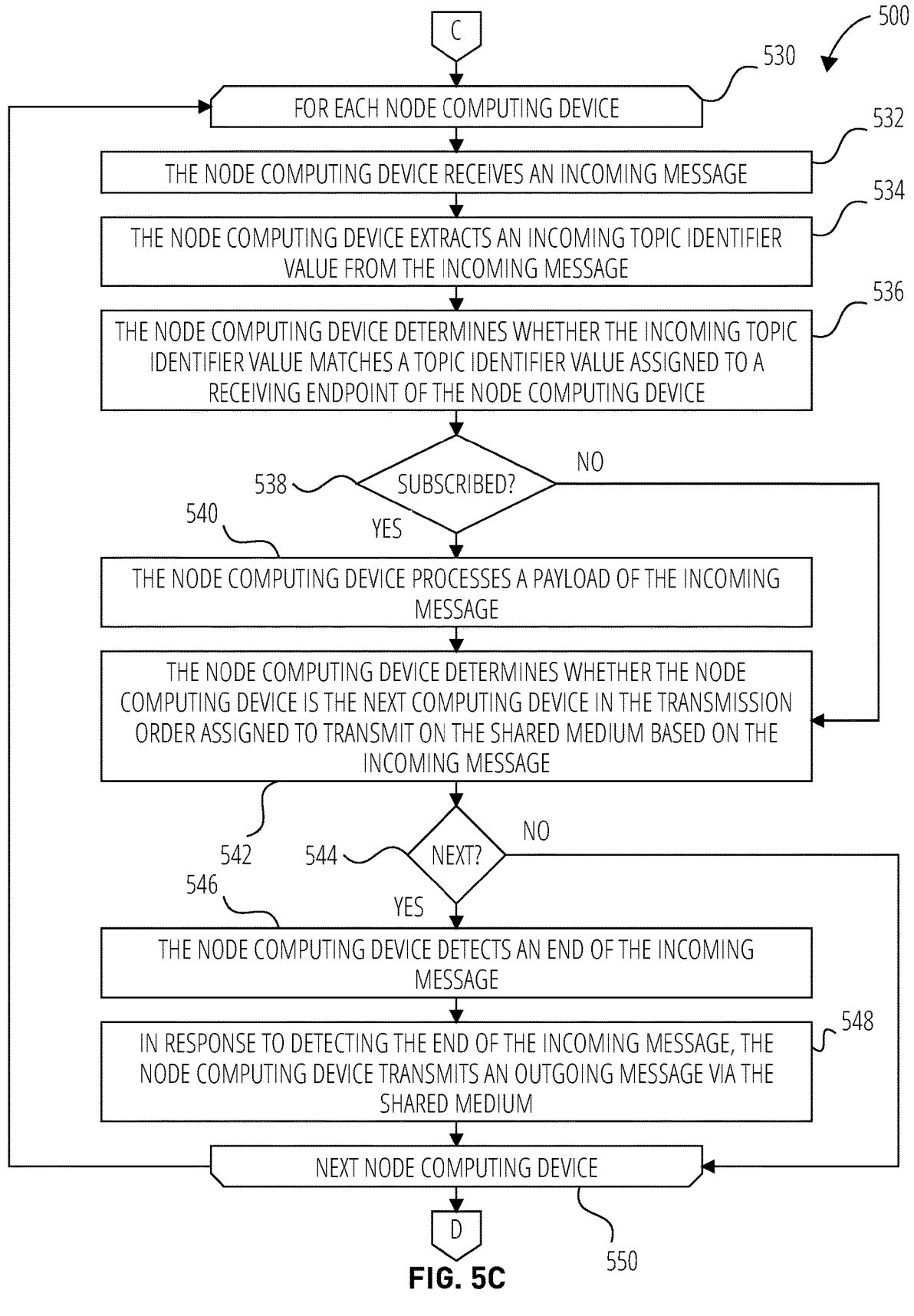

C

500

530

FOR EACH NODE COMPUTING DEVICE

532

THE NODE COMPUTING DEVICE RECEIVES AN INCOMING MESSAGE

534

THE NODE COMPUTING DEVICE EXTRACTS AN INCOMING TOPIC IDENTIFIER VALUE FROM THE INCOMING MESSAGE

536

THE NODE COMPUTING DEVICE DETERMINES WHETHER THE INCOMING TOPIC IDENTIFIER VALUE MATCHES A TOPIC IDENTIFIER VALUE ASSIGNED TO A RECEIVING ENDPOINT OF THE NODE COMPUTING DEVICE

538  SUBSCRIBED?   NO

540  YES

THE NODE COMPUTING DEVICE PROCESSES A PAYLOAD OF THE INCOMING MESSAGE

THE NODE COMPUTING DEVICE DETERMINES WHETHER THE NODE COMPUTING DEVICE IS THE NEXT COMPUTING DEVICE IN THE TRANSMISSION ORDER ASSIGNED TO TRANSMIT ON THE SHARED MEDIUM BASED ON THE INCOMING MESSAGE 542  544  NEXT?   NO

546  YES

THE NODE COMPUTING DEVICE DETECTS AN END OF THE INCOMING MESSAGE

548

IN RESPONSE TO DETECTING THE END OF THE INCOMING MESSAGE, THE NODE COMPUTING DEVICE TRANSMITS AN OUTGOING MESSAGE VIA THE SHARED MEDIUM

NEXT NODE COMPUTING DEVICE

| MOTOR | INIT INSTANCE 0 |
|---|---|
| MAC | 0X293411659820 |
| NODE ID | 0X52 |
| PWM SET (IN) | 0X06 |
| CURRENT (OUT) | 0X16 |
| ANGLE (OUT) | 0X26 |

604

| CTRL | INIT INSTANCE |
|---|---|
| MAC | 0X7372D381A132 |
| NODE ID | 0X3A |
| PWM SET 0 (OUT) | 0X06 |
| PWM SET 1 (OUT) | 0X07 |
| PWM SET 2 (OUT) | 0X08 |
| CURRENT 0 (IN) | 0X16 |
| CURRENT 1 (IN) | 0X17 |
| CURRENT 2 (IN) | 0X18 |
| ANGLE 0 (IN) | 0X26 |
| ANGLE 1 (IN) | 0X27 |
| ANGLE 2 (IN) | 0X28 |

608

| MOTOR | INIT INSTANCE 1 |
|---|---|
| MAC | 0X05843A871BC9 |
| NODE ID | 0XF3 |
| PWM SET (IN) | 0X07 |
| CURRENT (OUT) | 0X17 |
| ANGLE (OUT) | 0X27 |

610

| MOTOR | INIT INSTANCE 2 |
|---|---|
| MAC | 0X10387CA29011 |
| NODE ID | 0X2C |
| PWM SET (IN) | 0X08 |
| CURRENT (OUT) | 0X18 |
| ANGLE (OUT) | 0X28 |

FIG. 6

| 0 | 1 | 2 | 3 | | | N-2 | N-1 |
|---|---|---|---|---|---|---|---|
| START BYTE | TOTAL MESSAGE LENGTH | TOPIC IDENTIFIER VALUE | ORDER VALUE | PAYLOAD | | CRC | END BYTE |

FIG. 7

DATA-DRIVEN NETWORKING TECHNIQUES

TECHNICAL FIELD

This disclosure relates generally to computer networking, and in particular but not exclusively, relates to computer networking using shared communication media.

BACKGROUND

Various different networking technologies exist, with various advantages and disadvantages to each. In the realm of Information Technology (IT) networking, devices are often interconnected using an Ethernet-based technology. While Ethernet is universally standardized, the addressing and collision detection techniques used are inflexible and cause increased latency and use of bandwidth. In the realm of Operational Technology (OT), which is used to interconnect industrial devices such as sensors, motor controllers, etc., the timing and latency issues introduced by Ethernet and other IT networking technologies make such technologies unsuitable for use. For system level (backplane) interconnects, these issues are even more important.

What is desired are networking techniques that allow for high throughputs and low latencies over a shared medium.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of communicating on a shared medium is provided. A node computing device receives an incoming message via the shared medium and determines, based on the incoming message, whether the node computing device is the next computing device assigned to transmit on the shared medium. In response to determining that the node computing device is the next computing device assigned to transmit via the shared medium, the node computing device detects an end of the incoming message, and, in response to detecting the end of the incoming message, transmits an outgoing message via the shared medium.

In some embodiments, a computer-implemented method of managing communication between node computing devices of a set of node computing devices communicatively coupled to a shared medium is provided. A maestro computing device transmits one or more configuration messages to establish a transmission order for the set of node computing devices to transmit messages on the shared medium. The maestro computing device transmits a start message that initiates the transmission order for the set of node computing devices.

In some embodiments, a system for communication via a shared medium is provided. The system comprises a shared medium, a maestro computing device communicatively coupled to the shared medium, and a set of node computing devices that are each communicatively coupled to the shared medium. The set of node computing devices includes a first node computing device of a transmission order for the set of node computing devices to transmit messages on the shared medium. The maestro computing device is configured to transmit a start message via the shared medium, wherein the start message initiates the transmission order. The first node computing device is configured to receive the start message via the shared medium, and, in response to detecting an end of the start message, transmit an outgoing message via the shared medium.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5A-FIG. 5D are a flowchart that illustrates a non-limiting example embodiment of a method of communication via a shared medium according to various aspects of the present disclosure.

FIG. 6 illustrates identifiers assigned to node computing devices within a non-limiting example embodiment of a system according to various aspects of the present disclosure.

FIG. 7 is a schematic illustration of a non-limiting example embodiment of a message format for communication via a shared medium according to various aspects of the present disclosure.

DETAILED DESCRIPTION

The present disclosure provides techniques for highly efficient communication via a shared medium. In some embodiments, a transmission order is established between a number of computing devices coupled to the shared medium. When a message is broadcast to the shared medium, each of the computing devices coupled to the shared medium uses the message to determine its turn to transmit a message is next in the transmission order. When a computing device determines that its turn is next in the transmission order and detects the end of the currently incoming message, the computing device begins transmitting an outgoing message that can be used to identify the next computing device in the transmission order upon receipt. By using the transmission order that can be determined based on the incoming messages, collisions are avoided without losing bandwidth and increasing latency by using an additional collision avoidance protocol. Further, by using a detected end of a previous message to trigger a start of a subsequent message, the latency between messages transmitted on the shared medium can be extremely low. Also, by using broadcast transmission instead of addressed messages, the protocol overhead of each message can be drastically reduced compared to other communication technologies, thereby increasing the available bandwidth for substantive communication.

Figure 1:
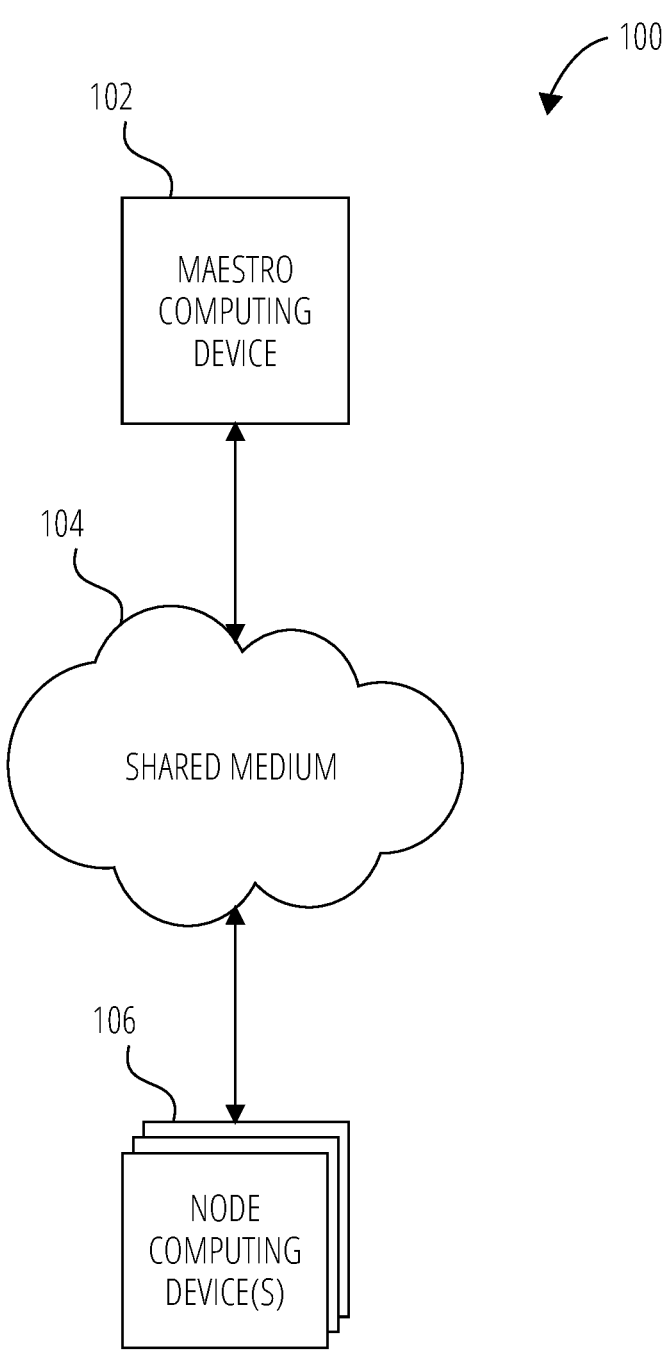
FIG. 1 is a block diagram that illustrates a non-limiting example embodiment of a system according to various aspects of the present disclosure.

FIG. 1 is a block diagram that illustrates a non-limiting example embodiment of a system according to various aspects of the present disclosure. In the system 100, a maestro computing device 102 and one or more node computing devices 106 are interconnected using a shared medium 104. The maestro computing device 102 is configured to set up and/or initiate communication between devices coupled to the shared medium 104, and to monitor communication on the shared medium 104. Each of the node computing devices 106 is configured to receive messages from the shared medium 104 and, at appropriate times, to transmit messages to the shared medium 104.

Such a system 100 may be useful in a variety of applications in which minimal latency and/or highly efficient communication is desired. As one non-limiting example embodiment, such a system 100 may be used in an industrial control application, such as for communication between a control device, one or more motors, and one or more sensors that generate data relevant to the control of the motors. As another non-limiting example, such a system 100 may be used for communications between a controller, sensors, and motors in a robot or other device.

Any suitable medium may be used for the shared medium 104. The present disclosure primarily describes the shared medium 104 as an electrical multidrop network, however, this embodiment should not be seen as limiting. In other embodiments, the shared medium 104 may be any broadcast network, including but not limited to optical broadcasts, radio broadcasts, or sonic broadcasts. By using a multidrop (or virtual multidrop) network, the system 100 keeps versatility and flexibility as high as possible.

In order to communicate within the system 100, each node computing device 106 waits its turn to transmit in a transmission order. Once it is the turn of a given node computing device 106, the given node computing device 106 transmits an outgoing message to the shared medium 104 that includes a topic identifier value. The other node computing devices 106 coupled to the shared medium 104 receive the message, and if the other node computing devices 106 are subscribed to a topic associated with the topic identifier value, the other node computing devices 106 process a payload of the message.

Each node computing device 106 is capable of detecting when it is time for it to transmit in the transmission order, which means that transmission of a subsequent message can follow immediately after completion of a previous message without using collision detection techniques, thus greatly reducing latency within the system. In addition to the fact that eliminating collisions reduces latency, collisions occur unpredictably and therefore cause the latency and the timing of messages to be non-deterministic. By eliminating collisions and the resulting non-deterministic behavior, embodiments of the present disclosure may support deterministic timing and latency. Further, because messages are broadcast to the shared medium 104 and each node computing device 106 is capable of processing or ignoring each incoming message based on the topic identifier values, header sizes and addressing information can be greatly reduced, thus more effectively utilizing the bandwidth of the shared medium 104 than in technologies with greater overhead such as Ethernet. The use of asynchronous data transfer at the physical level may further enable high-speed communication within the system 100.

Figure 9:
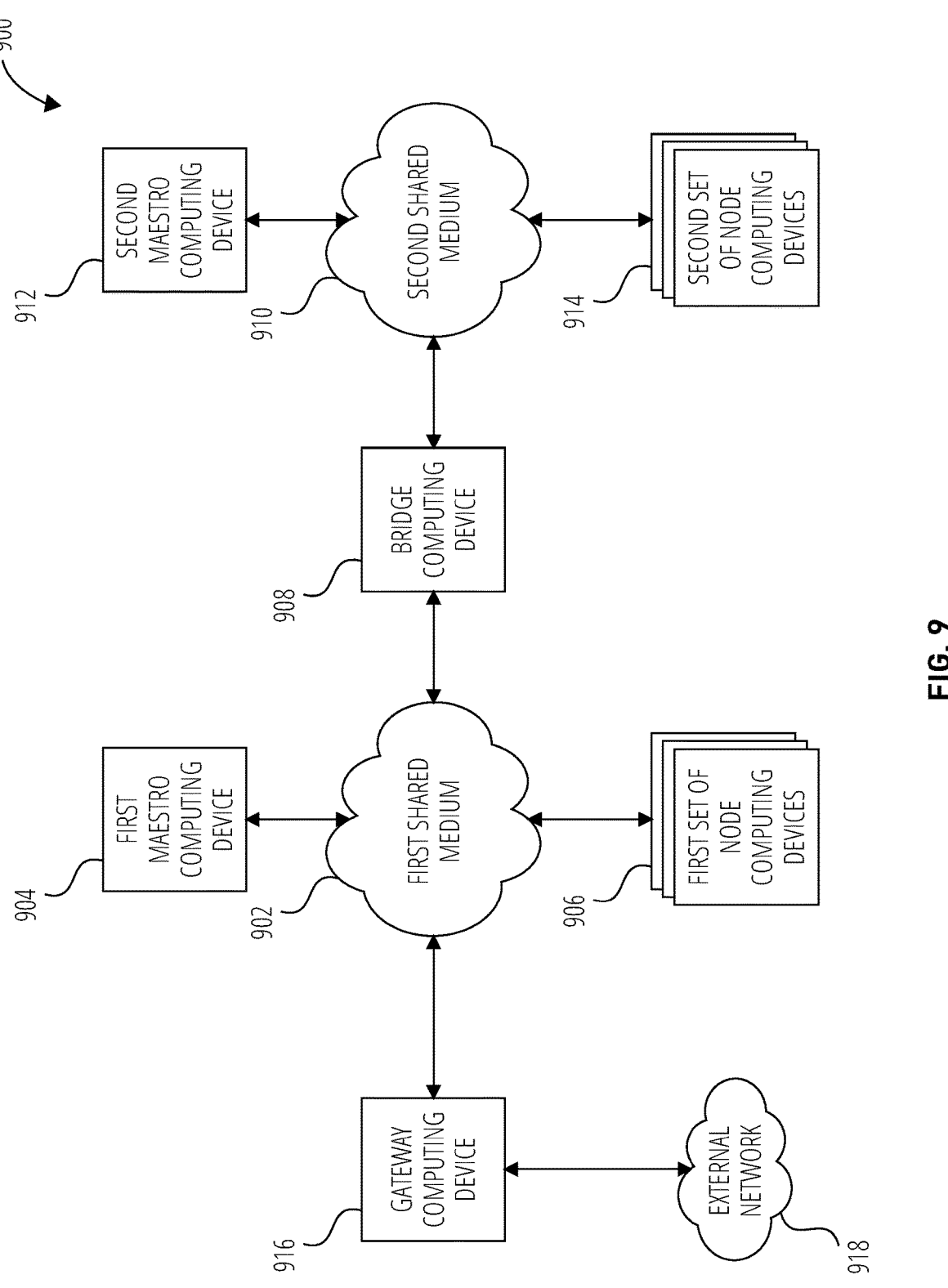
FIG. 9 is a block diagram that illustrates another non-limiting example embodiment of a system according to various aspects of the present disclosure.

As shown, the system 100 includes a single maestro computing device 102 and one or more node computing devices 106. In some embodiments, any number of one or more node computing devices 106 may be present. Typically, only a single maestro computing device 102 will be present per shared medium 104 in order to avoid inconsistent instructions. The system 100 illustrated in FIG. 1 is extremely simple in order to avoid obscuring the inventive aspects of the present disclosure. A more complex example, in which communication between multiple shared media is handled by a bridge computing device and communication between the shared medium and an external network is handled by a gateway computing device, is illustrated in FIG. 9 and discussed below.

Further, while the system 100 is illustrated with all communication between the devices occurring over the shared medium 104, in some embodiments, other communication media may be present. For example, in some embodiments, the shared medium 104 may be used for high-speed, low-latency communications during the transmission order, while another network (e.g., an Ethernet network, a wireless network including but not limited to a Wi-Fi network, etc.) may be used to communicate configuration messages and other commands for which latency and speed is not as important.

Figure 2:
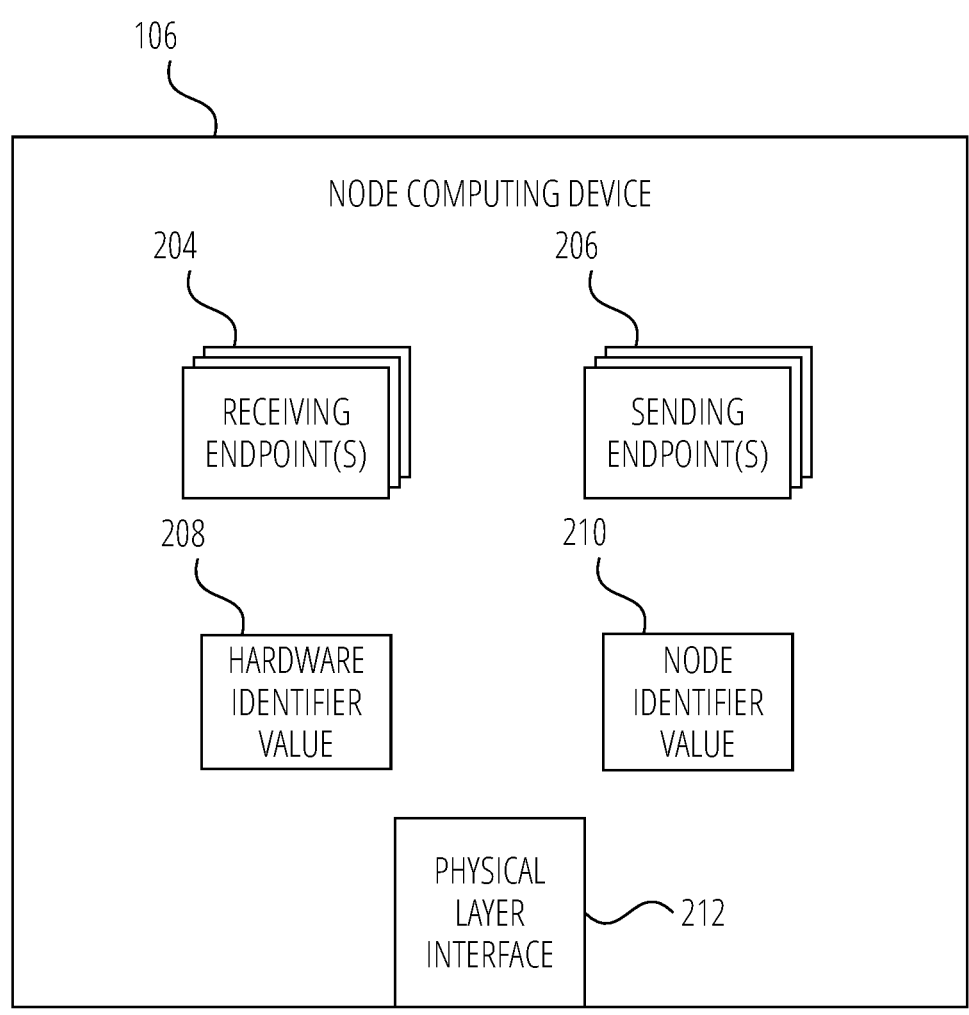
FIG. 2 is a block diagram that illustrates further details of a non-limiting example embodiment of a node computing device according to various aspects of the present disclosure.

FIG. 2 is a block diagram that illustrates further details of a non-limiting example embodiment of a node computing device according to various aspects of the present disclosure. The node computing device 106 may be any type of computing device with the illustrated components that is capable of communicating via the shared medium 104. A node computing device 106 may also include one or more other components not illustrated in FIG. 2, including but not limited to general purpose processors, special purpose processors (e.g., graphical processing units, ASICs, etc.), volatile or non-volatile computer-readable media (e.g., registers, RAM, ROM, flash memory, etc.), network interfaces, human-computer interface devices (e.g., displays, keyboards, mice, buttons, etc.); Some of these components may be used to provide the logical components illustrated in FIG. 2. Since the implementation of such non-illustrated components is within the level of skill of those of ordinary skill in the art, their details are not discussed further herein for the sake of brevity and so as to not obscure the inventive features of the disclosure.

As shown, the node computing device 106 includes one or more receiving endpoints 204 and one or more sending endpoints 206. In some embodiments, a node computing device 106 may have one or more receiving endpoints 204 without having any sending endpoints 206, or may have one or more sending endpoint 206 without having any receiving endpoints 204.

Each receiving endpoint 204 is a function provided by the node computing device 106 that receives and processes a type of information from the shared medium 104. One non-limiting example of a type of receiving endpoint 204 is a function that extracts a reported value from an incoming message and stores the value in a log. Another non-limiting example of a type of receiving endpoint 204 is a function that extracts a command from an incoming message and changes a setting of hardware associated with the node computing device 106 based on the command.

Each sending endpoint 206 is a function provided by the node computing device 106 that transmits a type of information to the shared medium 104. One non-limiting example embodiment of a type of sending endpoint 206 is a function that receives a value from a sensor and transmits the sensor value in an outgoing message. Another non-limiting example embodiment of a type of sending endpoint 206 is a function that determines a control value for a hardware device associated with another node computing device 106, and transmits an outgoing message including a command with the control value.

During a configuration process, each of the receiving endpoints 204 and sending endpoints 206 is assigned a topic identifier value. In some embodiments, the maestro computing device 102 may determine topic identifier values for each of the endpoints and assign the topic identifier values to the endpoints when configuring the system 100. In some embodiments, each of the endpoints may be preconfigured with a topic identifier value without receiving messages from the maestro computing device 102.

The illustrated node computing device 106 also includes a hardware identifier value 208, a node identifier value 210, and a physical layer interface 212. While in some embodiments, the hardware identifier value 208 may be configurable, the hardware identifier value 208 is generally immutable (such as a medium access control (MAC) address or similar value), and allows various types of configuration messages to be addressed to the node computing device 106. In some embodiments, the node identifier value 210 may be assigned by the maestro computing device 102 during configuration of the system 100, while in other embodiments, the node identifier value 210 may be preconfigured without receiving messages from the maestro computing device 102.

Figure 3:
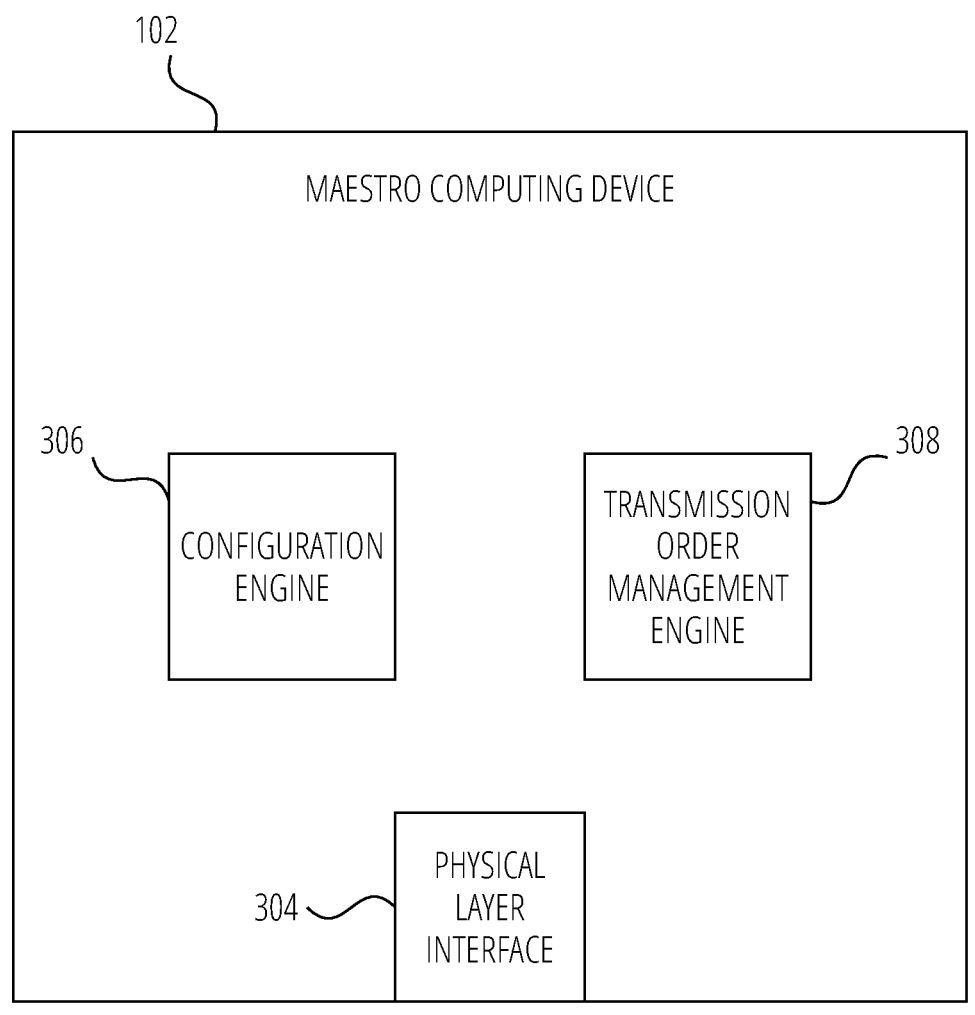
FIG. 3 is a block diagram that illustrates further details of a non-limiting example embodiment of a maestro computing device according to various aspects of the present disclosure.

FIG. 3 is a block diagram that illustrates further details of a non-limiting example embodiment of a maestro computing device according to various aspects of the present disclosure. The maestro computing device 102 may be any type of computing device with the illustrated components that is capable of communicating via the shared medium 104. A maestro computing device 102 may also include one or more other components not illustrated in FIG. 3, including but not limited to general purpose processors, special purpose processors (e.g., graphical processing units, ASICs, etc.), volatile or non-volatile computer-readable media (e.g., registers, RAM, ROM, flash memory, etc.), network interfaces, human-computer interface devices (e.g., displays, keyboards, mice, buttons, etc.); Some of these components may be used to provide the logical components illustrated in FIG. 3. Since the implementation of such non-illustrated components is within the level of skill of those of ordinary skill in the art, their details are not discussed further herein for the sake of brevity and so as to not obscure the inventive features of the disclosure.

As illustrated, the maestro computing device 102 includes a configuration engine 306, a transmission order management engine 308, and a physical layer interface 304. In some embodiments, the configuration engine 306 is configured to assign node identifier values and topic identifier values to the node computing devices 106 coupled to the shared medium 104, and to establish a transmission order for the node computing devices 106. In some embodiments, the transmission order management engine 308 is configured to start, monitor, and optionally reconfigure the transmission of messages by the node computing devices 106 according to the transmission order. In some embodiments, if the node computing devices 106 are preconfigured with node identifier values, topic identifier values, and information for establishing the transmission order prior to being coupled to the shared medium 104, then the configuration engine 306 may be omitted.

As used herein, "engine" refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

Figure 4A:
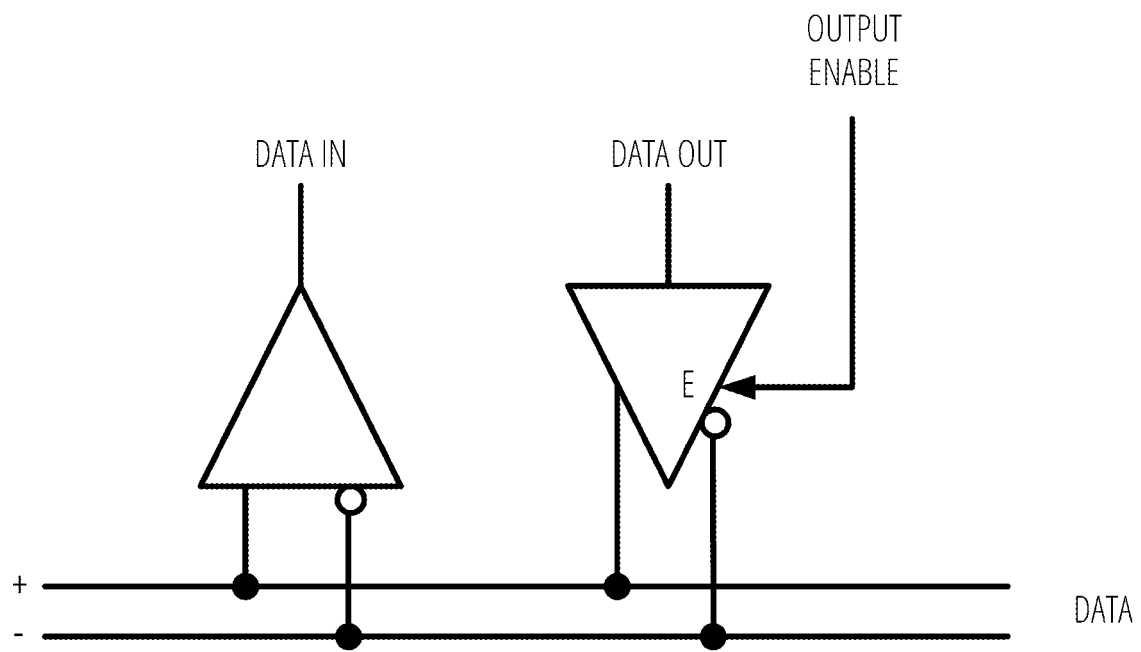
FIG. 4A-FIG. 4C are schematic illustrations of non-limiting example embodiments of physical layer hardware for devices participating in systems according to various aspects of the present disclosure.
Figure 4B:
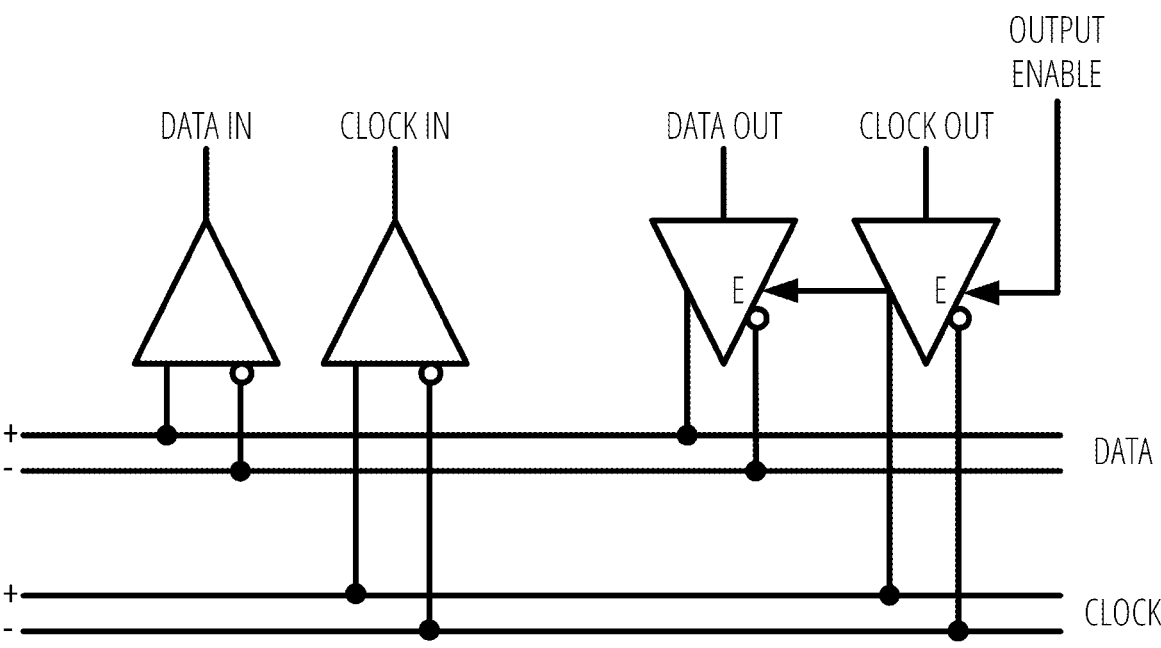
Figure 4C:
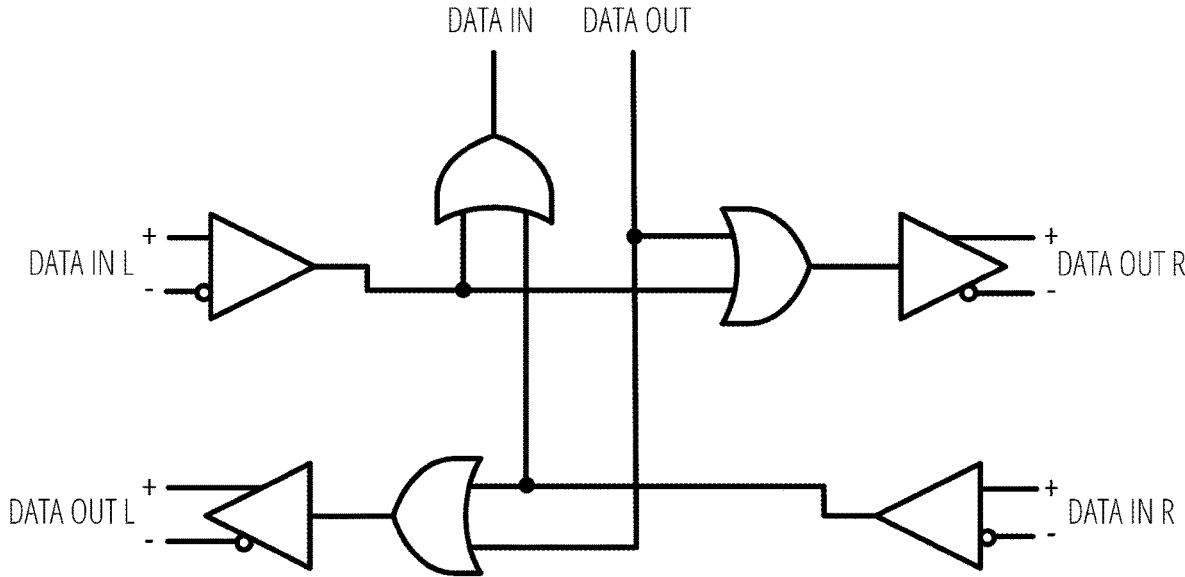
Figure 5D:
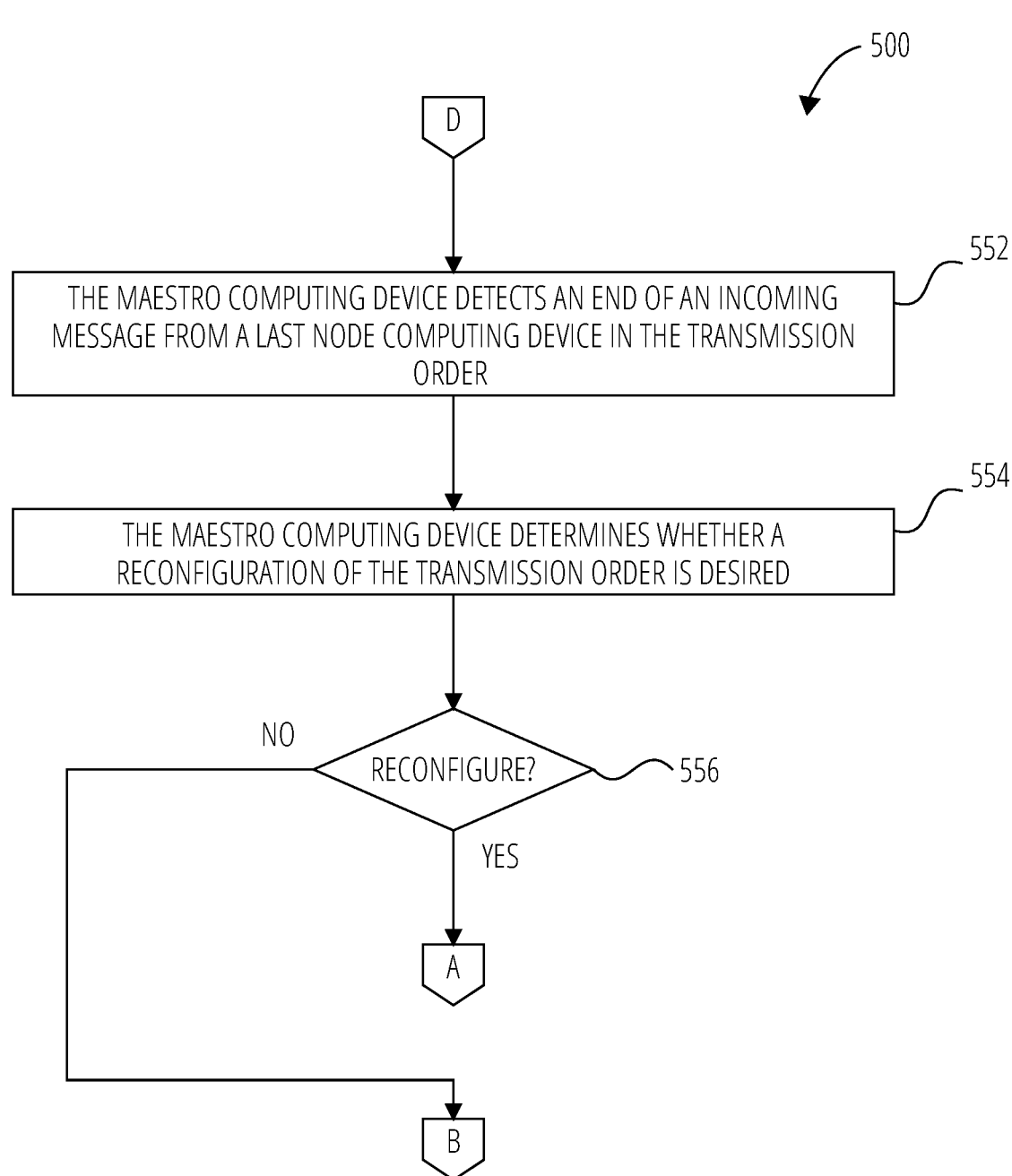

The physical layer interface 212 and the physical layer interface 304 are typically similar, and are configured based on the type of medium used for the shared medium 104. Any suitable hardware may be used for the physical layer interface 212 and physical layer interface 304, as well as for the shared medium 104. FIG. 4A-FIG. 4C are schematic illustrations of non-limiting example embodiments of physical layer hardware for devices participating in systems according to various aspects of the present disclosure. The hardware illustrated in FIG. 4A-FIG. 4C are non-limiting examples of hardware suitable for use within the physical layer interface 212 of the node computing device 106 or the maestro computing device 102, and the data/clock wires illustrated may be part of the shared medium 104. Each of the illustrations shows a one-bit serial link. In some embodiments, the bit width of the bus may be increased to an arbitrary length by providing the illustrated hardware for each desired bit. Also, while FIG. 4A-FIG. 4C illustrate electrical networks, it should be noted that in other embodiments, the physical layer interface 212 and physical layer interface 304 may provide communication with another type of shared medium, including but not limited to radio, optical, or sonic media.

FIG. 4A illustrates a non-limiting example embodiment of hardware for asynchronous data transfer. In FIG. 4A, two-wire bidirectional low voltage differential signaling (LVDS) is used to transmit data only (i.e., no clock signal is transmitted or received). The signaling using the hardware of FIG. 4A may be fully asynchronous, and may either use a fixed frequency (similar to USART asynchronous signaling) or include a pre-amble for clock recovery. Using a pre-amble for clock recovery may provide more flexibility in the frequency used, but at the cost of the additional overhead created by the pre-amble. One advantage of asynchronous data transfer on a multidrop bus shared medium 104 using hardware such as illustrated in FIG. 4A is that the wiring is minimal and transmission latencies (wire lengths) are irrelevant, since whenever an incoming message arrives at the physical layer interface 212, the node computing device 106 may pick it up. Working with a centralized clock may introduce problems because each node computing device 106 will synchronize to the clock signal, but when data is being transmitted toward the clock source, timing may be off.

That said, other embodiments may use shared clock signals to assist in data recovery. In some embodiments, instead of a shared clock that is synchronized, the clock signals may be driven by the same node computing device 106 that is transmitting data in order to avoid timing errors. FIG. 4B illustrates a non-limiting example embodiment of hardware for synchronous data transfer. In FIG. 4B, a two-by-two wire bidirectional medium is used, with one pair of conductors provided for data and another pair of conductors provided for clock signals. Transmission using the hardware illustrated in FIG. 4B is synchronous, and transmitting the clock signals helps simplify data recovery at each receiving node computing device 106. Since each node computing device 106 generates its own clock signal, latencies on the shared medium remain inconsequential, as in the asynchronous data transfer embodiment illustrated in FIG. 4A.

FIG. 4C illustrates a non-limiting example embodiment of hardware for virtual multidrop. The embodiment illustrated in FIG. 4C uses a four-wire unidirectional LVDS medium, and transmits data without a clock signal. This embodiment may operate at a fixed frequency and may be buffered at each node computing device 106. This embodiment is similar to the embodiment illustrated in FIG. 4A while supporting higher bit rates at the cost of additional data transfer conductors. At the cost of eight conductors per bit, even higher bit rates may be supported with a four-plus-four wire unidirectional medium that is similar to that illustrated in FIG. 4C but that includes both data and clock pairs. Such embodiments may provide synchronous communication that is buffered at each node to simplify data recovery, and again may allow each node computing device 106 to generate its own clock signal instead of a centralized clock in order to obtain the benefits described above.

FIG. 5A-FIG. 5D are a flowchart that illustrates a non-limiting example embodiment of a method of communication via a shared medium according to various aspects of the present disclosure. In the method 500, node computing devices 106 in a system (such as system 100) transmit and receive messages over a shared medium 104. By eliminating the overhead of point-to-point addressing and collision detection as used by other networking techniques, the system 100 may achieve extremely low latency and high bandwidth.

From a start block, the method 500 proceeds to block 502, where a maestro computing device 102 and one or more node computing devices 106 are coupled to a shared medium 104. In some embodiments in which a physical medium is used for the shared medium 104 (e.g., a set of electrical conductors), a physical connection between each of the node computing devices 106 and the shared medium 104, as well as between the maestro computing device 102 and the shared medium 104, may be established, such as by coupling plugs of conductors of the shared medium 104 to sockets of the node computing devices 106 and maestro computing device 102. In some embodiments in which a broadcast medium is used for the shared medium 104 (e.g., radio frequency communication, optical communication, sonic communication), being coupled to the shared medium 104 may include being brought within broadcast communication range of the other devices in the system 100.

The method 500 then proceeds to a set of identifier assignment actions 558 that include a for-loop defined between a for-loop start block 504 and a for-loop end block 516. Within the for-loop, actions for assigning one or more identifiers to each node computing device 106 are performed. These actions are illustrated within a group because, in some embodiments, one or more of the identifier assignment actions 558 may be optional. For example, in some embodiments, one or more node computing devices 106 may be preconfigured with one or more of the identifiers assigned during the identifier assignment actions 558 prior to being coupled to the shared medium 104 (or any other communication network), and the maestro computing device 102 may be preconfigured with the assignments of those identifiers prior to being coupled to the shared medium 104 (or any other communication network), and so the corresponding actions within the group of identifier assignment actions 558 may be skipped. In embodiments wherein the maestro computing device 102 and the node computing devices 106 do communicate to perform one or more of the identifier assignment actions 558, that communication may be performed via the shared medium 104, via a separate communication medium configured for the transmission of such communication, or via any other suitable technique.

From the for-loop start block 504, the method 500 advances to block 506, where the maestro computing device 102 interrogates the node computing device 106 to determine one or more endpoints present on the node computing device 106. In some embodiments, the maestro computing device 102 may transmit a query addressed to the hardware identifier value 208 for the node computing device 106, and the node computing device 106 may reply with a listing of any sending endpoints 206 and receiving endpoints 204 provided by the node computing device 106.

At block 508, the maestro computing device 102 transmits an identifier assignment message to the node computing device 106 that includes a node identifier value, and at block 510, the node computing device 106 receives the identifier assignment message and stores the node identifier value. As with the endpoint interrogation query, the identifier assignment message may be addressed using the hardware identifier value 208 for the node computing device 106.

At block 512, the maestro computing device 102 transmits a topic assignment message to the node computing device 106 that includes topic identifier values for each endpoint present on the node computing device 106. At block 514, the node computing device 106 receives the topic assignment message and stores the topic identifier values for each endpoint. Again, the topic assignment message may be addressed using the hardware identifier value 208 for the node computing device 106. Alternatively, if the node computing device 106 has already received the node identifier value assigned at block 508, the topic assignment message may be addressed using the node identifier value.

The method 500 then proceeds to the for-loop end block 516. If more node computing devices 106 remain to be processed, then the method 500 returns from the for-loop end block 516 to the for-loop start block 504 to process the next node computing device 106. Otherwise, the method 500 proceeds to a continuation terminal ("terminal A").

FIG. 6 is a schematic illustration of identifiers assigned to node computing devices within a non-limiting example embodiment of a system according to various aspects of the present disclosure. The example shown in FIG. 6 is a non-limiting example that helps explain the state of the system 100 after execution of the group of identifier assignment actions 558.

In the illustrated system 100, four node computing devices 106 are provided: a motor controller and three motors. The motor controller provides control signals to each of the motors, and receives current and angle information reported by each motor. Accordingly, FIG. 6 shows a set of motor controller settings 604, a set of first motor settings 606, a set of second motor settings 608, and a set of third motor settings 610. Each of the sets of settings includes a hardware identifier value 208 (a "MAC" address) and a node identifier value 210 (a "NODE ID"). The set of motor controller settings 604 includes topic identifier values for three sending endpoints 206 ("PWM SET 0," "PWM SET 1," and "PWM SET 2"), with a sending endpoint 206 configured to transmit instructions to each of the motors. The set of motor controller settings 604 also includes topic identifier values for six receiving endpoints 204 ("CURRENT 0," "CURRENT 1," "CURRENT 2," "ANGLE 0," "ANGLE 1," and "ANGLE 2"), with a receiving endpoint 204 configured to receive each separate value from each separate motor. For each set of motor settings 606-610, topic identifier values are provided for a receiving endpoint 204 for receiving the control signals transmitted by the motor controller ("PWM SET") and two sending endpoints 206 for transmitting telemetry values to the motor controller ("CURRENT" and "ANGLE").

In order to connect a sending endpoint 206 and a receiving endpoint 204, matching topic identifier values are assigned to the corresponding endpoints. For example, the topic identifier value assigned to the "PWM SET 0" sending endpoint 206 of the set of motor controller settings 604 is "0x06." Likewise, the topic identifier value assigned to the "PWM SET" receiving endpoint 204 of the set of first motor settings 606 is also "0x06." As such, values transmitted with the topic identifier value of "0x06" by the motor controller will be received for processing by the first motor. Similarly, the topic identifier value assigned to the "CURRENT" sending endpoint 206 of the set of first motor settings 606 is "0x16," and a matching topic identifier value is assigned to the "CURRENT 0" receiving endpoint 204 of the set of motor controller settings 604. Other connected endpoints within the system are likewise assigned matching topic identifier values. One will note that multiple different receiving endpoints 204 may be associated with the same topic identifier value so that a single message may be processed by multiple different devices, and/or multiple different sending endpoints 206 may be associated with the same topic identifier value so that more than one device may transmit information to be interpreted for the same purpose.

Returning to the discussion of the method 500, from terminal A in FIG. 5A, the method 500 proceeds to terminal A in FIG. 5B. From terminal A in FIG. 5B, the method 500 proceeds to a set of transmission order assignment actions 560. These actions are illustrated within a group because, in some embodiments, one or more of the transmission order assignment actions 560 may be optional. For example, in some embodiments, the transmission order between the node computing devices 106 may be preconfigured and fixed during engineering of the network, with the relevant information stored in the devices prior to being connected to any network. In such embodiments, the corresponding actions within the transmission order assignment actions 560 may be skipped. In embodiments wherein the maestro computing device 102 and the node computing devices 106 do communicate to perform one or more of the transmission order assignment actions 560, that communication may be performed via the shared medium 104, via a separate communication medium configured for the transmission of such communication, or via any other suitable technique.

At block 518, the maestro computing device 102 determines a transmission order for the node computing devices 106. In some embodiments, each node computing device 106 within the system 100 awaits its turn in the transmission order before transmitting a message, and once its turn arrives, the node computing device 106 transmits a message on the shared medium 104. Each node computing device 106 is capable of determining when its turn in the transmission order occurs solely based on messages received via the shared medium 104, such that separate synchronization or collision detection need not be performed.

The method 500 then proceeds to a for-loop defined between a for-loop start block 520 and a for-loop end block 526, wherein each node computing device 106 of the node computing devices 106 receives a configuration message from the maestro computing device 102. From the for-loop start block 520, the method 500 proceeds to block 522, where the maestro computing device 102 transmits a configuration message to the node computing device 106 that includes information for establishing the transmission order.

Any type of information may be used to establish the transmission order. As one non-limiting example, each node computing device 106 may be provided the node identifier value 210 of the next node computing device 106 in the transmission order, and each node computing device 106 may insert the next node value in its outgoing message to notify the next node computing device 106 that its turn has arrived. As another non-limiting example, each node computing device 106 may be provided a topic identifier value of the next topic in the transmission order, and each node computing device 106 may insert the next topic value in its outgoing message to notify a node computing device 106 that is uniquely associated with the next topic value that its turn has arrived. As yet another non-limiting example, a combination of both a node identifier value 210 and a topic identifier value may be used to uniquely identify the next node computing device 106 in the transmission order. In some embodiments, instead of using a linked-list technique wherein each node computing device 106 is informed of the next node computing device 106 in the transmission order, each node computing device 106 may be assigned a message slot in the transmission order, and each node computing device 106 may count messages transmitted on the shared medium 104 to determine when its assigned message slot occurs.

At block 524, the node computing device 106 stores the information for establishing the transmission order. The method 500 then proceeds to the for-loop end block 526. If further node computing devices 106 remain to be processed, then the method 500 returns from for-loop end block 526 to for-loop start block 520 to process the next node computing device 106. Otherwise, the method 500 proceeds to a continuation terminal ("terminal B").

From terminal B, the method 500 proceeds to block 528, where the maestro computing device 102 transmits a start message that initiates the transmission order for the set of node computing devices 106. In some embodiments, the start message may be similar to any other message transmitted within the system 100, differing only in that it is sent by the maestro computing device 102 instead of a node computing device 106, and including information usable for identifying the first node computing device 106 in the transmission order as the next transmitting node. In some embodiments, the start message may include a zero-length payload, or may include a payload value relevant to the start of the transmission order. The method 500 then advances to a continuation terminal ("terminal C").

From terminal C (FIG. 5C), the method 500 proceeds to a for-loop defined between a for-loop start block 530 and a for-loop end block 550, in which the node computing devices 106 receive and transmit messages via the shared medium 104 according to the transmission order. While FIG.

5C illustrates these actions in a for-loop to provide a clear description of the actions separately performed by each node computing device 106, one of ordinary skill in the art will recognize that since the messages are transmitted and received via the shared medium 104, each receiving node computing device 106 will begin executing the actions of the for-loop once it begins receiving the incoming message. Accordingly, the node computing devices 106 within the system 100 will execute the actions of the for-loop concurrently but for differences in timing induced by differences in transmission delay between the node computing devices 106.

From the for-loop start block 530, the method 500 advances to block 532, where the node computing device 106 receives an incoming message. When a first node computing device 106 is the next node to transmit in the transmission order, the incoming message may be the start message. For subsequent node computing devices 106 in the transmission order, the incoming message may be an outgoing message transmitted by a previous node computing device 106 in the transmission order.

FIG. 7 is a schematic illustration of a non-limiting example embodiment of a format for a message according to various aspects of the present disclosure. As shown, the message includes N bytes: a start byte (byte 0), a total message length value (byte 1), a topic identifier value (byte 2), an order value (byte 3), zero or more payload bytes, a cyclic redundancy check (CRC) value (byte N−2), and an end byte (byte N−1). The start byte includes a pattern of bits that allows receiving node computing devices 106 to detect that a message has started and to align itself to the received signals. The CRC value allows receiving node computing devices 106 to ensure that the rest of the message was received without corruption, and the end byte includes a pattern of bits that allows receiving node computing devices 106 to confirm, along with the total message length value, that the end of the message has been reached.

In some embodiments, the total message length value indicates the number of bytes in the message. As discussed elsewhere herein, a next node computing device 106 to transmit may begin transmitting once it has received the end byte of a previous message. By including the total message length value, the payload may be of variable length, and the next node computing device 106 may still accurately detect the end byte of the previous message. In some embodiments, the total message length value may be omitted if all of the payload values have the same length.

In some embodiments, the topic identifier value identifies a type of information included in the message. These topic identifier values may then be used by receiving endpoints to filter for information that is relevant to them. For example, if a topic identifier value indicates a type of information used by a given receiving endpoint, the message tagged with the topic identifier value will be processed by the receiving endpoint, and if not, the message will be ignored.

In some embodiments, the order value includes any suitable value that receiving node computing devices 106 may use for identifying the next node computing device 106 in the transmission order to transmit a subsequent message. In some embodiments, the order value may include a next node value that specifies the node identifier value of the next node computing device 106 in the transmission order. In such embodiments, the next node computing device 106 may choose a topic value to be included in the next message. In some embodiments, the order value may include a next topic value that specifies a topic value to be used in the next message, which may uniquely identify the next node computing device 106 if the topic values have been uniquely assigned to the node computing devices 106 (i.e., each unique topic value is assigned to a unique sending endpoint within the system 100). In some embodiments, more than one order value may be included in more than one order value byte. For example, in some embodiments, both a next node value and a next topic value may be included. In some embodiments, such as embodiments that assign message slots to the node computing devices 106 which then track the transmission order using a slot counter, the byte for the order value may be omitted from the message.

Returning to FIG. 5C, at block 534, the node computing device 106 extracts an incoming topic identifier value from the incoming message (for example, byte 2 in FIG. 7). At block 536, the node computing device 106 determines whether the incoming topic identifier value matches a topic identifier value assigned to a receiving endpoint 204 of the node computing device 106. For example, in the illustrated embodiment of FIG. 6, the first motor settings 606 have the topic identifier value 0x06 assigned to the receiving endpoint 204 for PWM SET, and so if the incoming topic identifier value was 0x06, the node computing device 106 associated with the first motor settings 606 would determine that the incoming topic identifier value matches the topic identifier value assigned to this receiving endpoint 204.

The method 500 then proceeds to decision block 538. If it was determined that the incoming topic identifier value matches a topic identifier value assigned to a receiving endpoint 204 of the node computing device 106, then the result of decision block 538 is YES, and the method 500 proceeds to block 540. At block 540, the node computing device 106 processes a payload of the incoming message. In some embodiments, the node computing device 106 may wait until the entirety of the incoming message is received before processing the payload, at least so that the CRC value may be used to ensure that the payload was received without corruption before processing. In other embodiments, the node computing device 106 may begin processing bytes of the payload immediately upon receipt. Processing of the payload may include any suitable action, including but not limited to changing a device setting based on a value extracted from the payload; storing/logging a value extracted from the payload; causing a value extracted from the payload to be presented to a user; or any other suitable action. The method 500 then proceeds from block 540 to block 542.

Returning to decision block 538, if it had been determined that the incoming topic identifier value does not match a topic identifier value assigned to a receiving endpoint 204 of the node computing device 106, then the result of decision block 538 is NO, and the method 500 skips block 540 and moves directly to block 542. At block 542, the node computing device 106 determines whether the node computing device 106 is the next computing device in the transmission order assigned to transmit on the shared medium 104, based on the incoming message. In some embodiments, the incoming message includes an order value (e.g., byte 3 in FIG. 7) that identifies the next computing device in the transmission order. In such embodiments, the node computing device 106 may extract the order value (e.g., a next node value, a next topic value, multiple values, etc.) from the incoming message, and may determine whether the order value matches a corresponding value assigned to the node computing device 106 (e.g., whether the next node value matches a node identifier value 210 of the node computing device 106; whether the next topic value matches a topic value assigned to a sending endpoint 206 of the node computing device 106;

etc.). In some embodiments wherein a slot counter is used, the node computing device 106 may increment a slot counter based on receipt of the incoming message, and may determine whether the slot counter indicates that a transmission slot assigned to the node computing device 106 is the next transmission slot.

The method 500 then proceeds to decision block 544. If it was determined that the node computing device 106 is the next computing device in the transmission order, then the result of decision block 544 is YES, and the method 500 proceeds to block 546. At block 546, the node computing device 106 detects an end of the incoming message. In some embodiments, the node computing device 106 may detect the end of the incoming message by counting a number of received bytes and comparing it to the incoming message length value (e.g., byte 1 in FIG. 7); by detecting the pattern of bits in the end byte (e.g., byte N–1 in FIG. 7), or both. At block 548, in response to detecting the end of the incoming message, the node computing device 106 transmits an outgoing message via the shared medium 104. By beginning transmission of the outgoing message in response to detecting the end of the incoming message, latency within the system 100 can be kept very low while also avoiding collisions between messages.

In some embodiments, the outgoing message includes contents similar to those illustrated in FIG. 7. In some embodiments, an outgoing topic identifier value of the outgoing message may be determined by a next topic value from the incoming message. In other embodiments, the node computing device 106 may choose the outgoing topic identifier value from multiple topic identifier values assigned to multiple sending endpoints 206 of the node computing device 106. For example, the node computing device 106 associated with the first motor settings 606 of FIG. 6 may choose either the topic identifier value 0x16 associated with the CURRENT sending endpoint 206, or the topic identifier value 0x26 associated with the ANGLE sending endpoint 206. In some embodiments, the order value (e.g., byte 3 in FIG. 7) may be determined by the transmission order. In some embodiments, the node computing device 106 may choose to override the transmission order for one or more messages. For example, if a node computing device 106 includes multiple sending endpoints 206, the node computing device 106 may assign its own node identifier value 210 as the next node value in order to transmit values from each of its sending endpoints 206 before assigning a node identifier value 210 of the next node computing device 106 in the transmission order.

The method 500 then advances to the for-loop end block 550. Returning to decision block 544, if it was determined that the node computing device 106 is not the next computing device in the transmission order, then the result of decision block 544 is NO, and the method 500 advances directly to the for-loop end block 550. If other node computing devices 106 have not yet processed the incoming message, then the method 500 returns to for-loop start block 530 for the other node computing devices 106 to complete their processing.

After all of the node computing devices 106 have received and processed the incoming message, the next outgoing message will be transmitted by block 548, and the method 500 will repeat the for-loop from for-loop start block 530 to for-loop end block 550 with the outgoing message transmitted by block 548 as the incoming message. Since the order value uniquely identifies a node computing device 106 (or the maestro computing device 102), only a single computing device will take the YES branch of decision block 544 for each incoming message, and so collisions between messages on the shared medium 104 are avoided.

Eventually, the end of the transmission order will be reached, and none of the node computing devices 106 will reach the YES branch of decision block 544 because the transmission order will have returned to the maestro computing device 102. At that point, the method 500 advances from for-loop end block 550 to a continuation terminal ("terminal D").

From terminal D (FIG. 5D), the method 500 proceeds to block 552, where the maestro computing device 102 detects an end of an incoming message from a last node computing device 106 in the transmission order. In some embodiments, the maestro computing device 102 detects that the end of the transmission order has been reached by the incoming message including an order value (e.g., a next node value or a next topic value) associated with the maestro computing device 102. In some embodiments, the maestro computing device 102 detects that the end of the transmission order has been reached by a slot counter indicating that a transmission slot associated with the maestro computing device 102 has been reached.

At block 554, the maestro computing device 102 determines whether a reconfiguration of the transmission order is desired. In some embodiments, it may be desired to alter the frequency at which one or more of the node computing devices 106 transmit messages to the shared medium 104. For example, it may be desired to obtain highly granular and timely information from an encoder device or other device that indicates a constantly changing state within the system 100, while it may be desired to occasionally sample information from an ambient temperature sensor or other device that indicates a value that is not likely to change often. As such, the maestro computing device 102 may remove one or more node computing devices 106 from the transmission order for one or more iterations of the transmission order when information from the node computing devices 106 is not desired, and may add the one or more node computing devices 106 back to the transmission order once information from those devices is desired. As another example, the maestro computing device 102 may detect that one or more node computing devices 106 have been added to the system 100 after the establishment of the transmission order, and may wish to reconfigure the transmission order to include the newly added node computing devices 106.

At decision block 556, if the maestro computing device 102 had determined that a reconfiguration of the transmission order is desired, then the result of decision block 556 is YES, and the method 500 returns to terminal A to determine the new transmission order and send configuration messages for implementation. Otherwise, if a reconfiguration of the transmission order is not desired, then the result of decision block 556 is NO, and the method 500 returns to terminal B to send a subsequent start message to instantiate another loop of the transmission order.

As illustrated, the method 500 is executed indefinitely so long as the node computing devices 106 and maestro computing device 102 remain active and connected to the shared medium 104. One of ordinary skill in the art will recognize that in some embodiments, the method 500 may be interrupted and end at any point, whether based on a command from a user, a disconnection of one or more of the devices from the system, or via any other suitable action.

Figure 8:
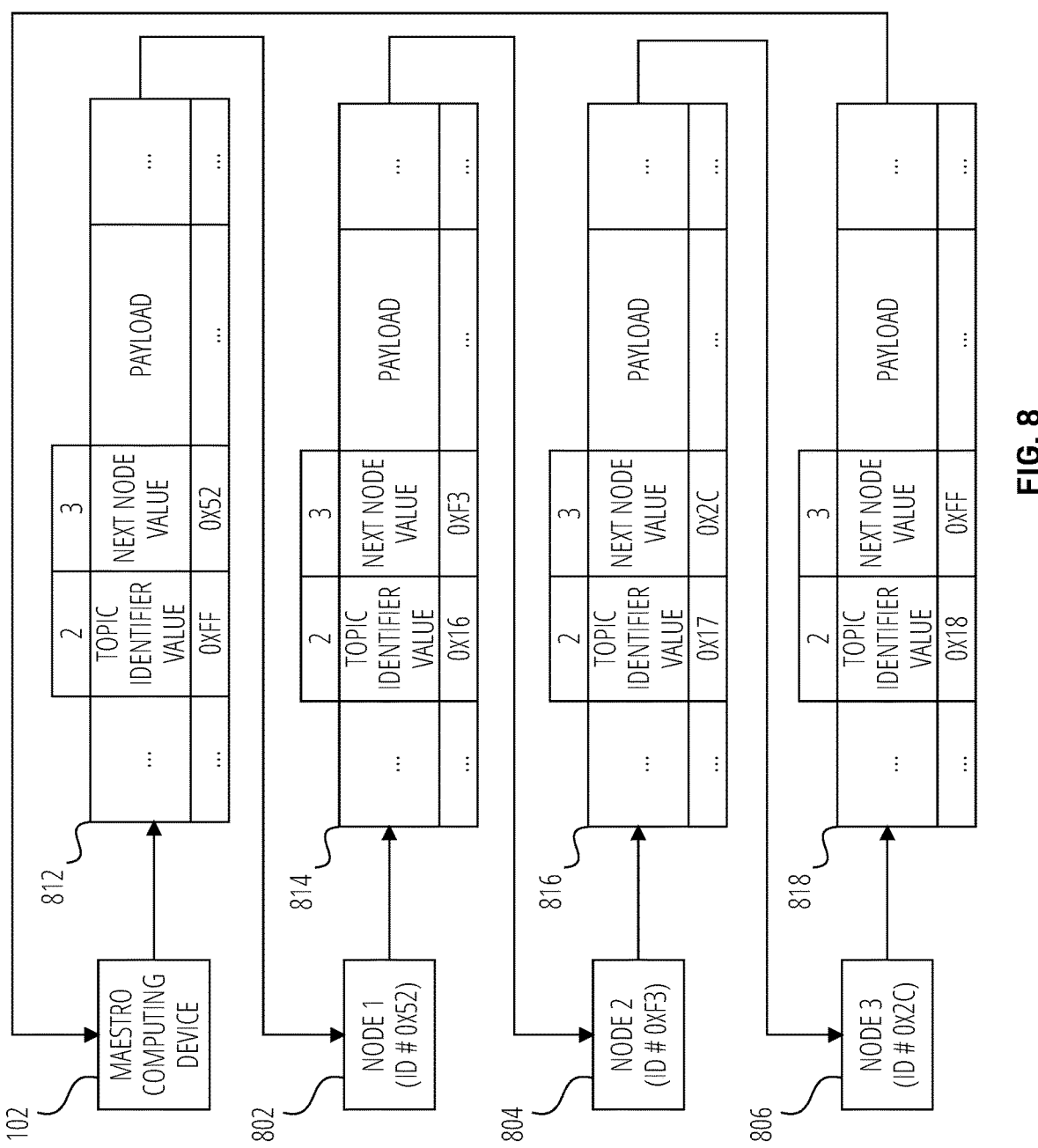
FIG. 8 is a schematic illustration of a non-limiting example embodiment of communication within a system based on a transmission order, according to various aspects of the present disclosure.

FIG. 8 illustrates a non-limiting example embodiment of communication within a system according to a transmission order, according to various aspects of the present disclosure. In the illustrated example embodiment, the order value provided in byte 3 is a next node value for the sake of discussion, though one of ordinary skill in the art will recognize that similar techniques may be used if other types of information (such as a next topic value, or multiple combined values) are used for the order value. One of ordinary skill in the art will also recognize that the portions of the messages relevant to the transmission order (e.g., order values) are illustrated in detail, but other portions of the messages that are described elsewhere herein have been omitted to avoid obscuring the relevant features.

Communication via the transmission order starts when the maestro computing device 102 transmits a start message 812. The start message 812 includes a topic identifier value that is reserved for the start message, and a next node value that includes the node identifier value 210 associated with a first node computing device 106 (labeled as node 1 802). Accordingly, when node 1 802 receives the start message 812, it extracts the next node value, determines that it identifies its own node identifier value 210, and thereby determines that it is the next node computing device 106 in the transmission order. The other node computing devices 106 within the system (a second node computing device 106, labeled as node 2 804, and a third node computing device 106, labeled as node 3 806) would also receive the start message 812 when it is transmitted via the shared medium 104, but because the next node value in the start message 812 does not include their associated node identifier values 210, they do not determine that they are the next node computing device 106 in the transmission order.

In response to detecting the end of the start message 812, node 1 802 generates a first outgoing message 814 and transmits it to the shared medium 104. During configuration, node 1 802 had received information indicating that node 2 804 is the next node in the transmission order after node 1 802. Accordingly, node 1 802 places the node identifier value 210 of node 2 804 in the next node value of the first outgoing message 814.

The first outgoing message 814 is received by the maestro computing device 102, node 2 804, and node 3 806. Since the next node value of the first outgoing message 814 identifies node 2 804, only node 2 804 determines that it is the next node computing device 106 in the transmission order. Accordingly, upon detecting the end of the first outgoing message 814, node 2 804 generates a second outgoing message 816 and transmits it to the shared medium 104. During configuration, node 2 804 had received information that node 3 806 is the next node in the transmission order after node 2 804, and so has placed the node identifier value 210 of node 3 806 in the second outgoing message 816.

The second outgoing message 816 is received by the maestro computing device 102, node 1 802, and node 3 806. Since the next node value of the second outgoing message 816 identifies node 3 806, only node 3 806 determines that it is the next node computing device 106 in the transmission order. Accordingly, upon detecting the end of the second outgoing message 816, node 3 806 generates a third outgoing message 818 and transmits it to the shared medium 104. During configuration, node 3 806 had received information that either it was the last node computing device 106 in the transmission order, or that the next computing device in the transmission order is the maestro computing device 102, and so has placed a value associated with the maestro computing device 102 in the next node value of the third outgoing message 818.

The third outgoing message 818 is received by the maestro computing device 102, the node 1 802, and the node 2

804. Since the next node value of the third outgoing message 818 is associated with the maestro computing device 102, the transmission order returns to the maestro computing device 102, which may then adjust the transmission order before sending another start message, or may simply transmit another start message 812 to perform another iteration of the transmission order as illustrated.

One will note that in the illustrated embodiment, the topic identifier value of 0xFF is reserved for the start message, and a node identifier value of 0xFF is reserved for the maestro computing device 102. These values are examples only, and in other embodiments, different values may be used to identify the start message and/or to designate the maestro computing device 102 as the next node in the transmission order. In some embodiments, a null value (0x00) or other default value may indicate a node computing device 106 that has not yet been configured by the maestro computing device 102.

One benefit of using a maestro computing device 102 on the shared medium 104 is that the maestro computing device 102 can monitor messages transmitted by the node computing devices 106, detect errors in the transmission order, and reconfigure the transmission order in order to recover from errors. For example, the maestro computing device 102 may be configured with a timeout threshold. The maestro computing device 102 may measure a period of time that elapses after the end of an incoming message, and may compare the period of time to the timeout threshold. If the period of time is greater than the timeout threshold, the maestro computing device 102 may determine that an error has occurred at the next node computing device 106 in the transmission order after the node computing device 106 that transmitted the incoming message, and may take one or more corrective actions to reset communication on the shared medium 104. For example, the maestro computing device 102 may simply resend the start message to restart the transmission order. This action may be effective if the failure in the transmission order was due to, for example, a transient communication error causing the next node computing device 106 to fail to successfully receive the incoming message. As another example, the maestro computing device 102 may send one or more reconfiguration messages (e.g., the messages transmitted in the group of transmission order assignment actions 560) that remove the failed node computing device from the transmission order for one or more iterations of the transmission order.

While the system 100 illustrated above is simple in order to describe the basic communication between the maestro computing device 102 and node computing devices 106, in some embodiments, more complicated network topologies may be established. FIG. 9 is a block diagram that illustrates another non-limiting example embodiment of a system according to various aspects of the present disclosure. The system 900 includes additional types of computing devices that are configured to communicate via at least a shared medium 104.

As shown, the system 900 includes a first shared medium 902 and a second shared medium 910. Each of the first shared medium 902 and the second shared medium 910 is associated with a single maestro computing device 102 that manages communication on its associated shared medium: a first maestro computing device 904 manages communication on the first shared medium 902, and a second maestro computing device 912 manages communication on the second shared medium 910. The first shared medium 902 and the second shared medium 910 are isolated from each other, such that messages transmitted by devices coupled to the first shared medium 902 are not received by devices coupled to the second shared medium 910, and messages transmitted by devices coupled to the second shared medium 910 are not received by devices coupled to the first shared medium 902.

The system 900 includes a bridge computing device 908. The bridge computing device 908 may include components similar to the node computing device 106 illustrated in FIG. 2, but may include a first physical layer interface 212 coupled to the first shared medium 902, and a second physical layer interface 212 coupled to the second shared medium 910. The bridge computing device 908 may include a receiving endpoint 204 and a sending endpoint 206 for each shared medium, and may retransmit messages received from one of the shared media to the other shared medium in order to support communication between the shared media. The respective first maestro computing device 904 and second maestro computing device 912 may include these sending endpoints 206 and receiving endpoints 204 within the transmission order similarly to any other endpoints on other node computing devices 106.

For example, the bridge computing device 908 may have a receiving endpoint 204 on the first shared medium 902 paired with a sending endpoint 206 on the second shared medium 910. If an incoming message is directed to the receiving endpoint 204 on the first shared medium 902, the bridge computing device 908 processes the message and, when its place in the transmission order on the second shared medium 910 is reached, generates an outgoing message using the sending endpoint 206 on the second shared medium 910.

As shown, the system 900 also includes a gateway computing device 916. The gateway computing device 916 may also include components similar to the node computing device 106 illustrated in FIG. 2, such as a physical layer interface 212 configured to be coupled to the first shared medium 902, one or more sending endpoints 206, and one or more receiving endpoints 204. The gateway computing device 916 also includes components for communicating with an external network 918. The external network 918 may be an Ethernet network, a wireless network, or network using any type of communication technology other than a shared medium.

As with the bridge computing device 908, the gateway computing device 916 may include a receiving endpoint 204 for receiving messages from the first shared medium 902 and a sending endpoint 206 for transmitting messages to the first shared medium 902, and the sending endpoint 206 may be included by the first maestro computing device 904 within the transmission order. When a message is received at the receiving endpoint 204 by the gateway computing device 916, the gateway computing device 916 processes the message and creates a transmission on the external network 918 based on the message. For example, the gateway computing device 916 may extract addressing information from the payload of the message, and may use the addressing information to create a packet to be transmitted on the external network 918. When a transmission is received by the gateway computing device 916 from the external network 918 that is intended for the first shared medium 902, the gateway computing device 916 creates a message with a suitable payload based on the transmission, and the sending endpoint 206 of the gateway computing device 916 transmits the message to the first shared medium 902 when its turn in the transmission order arises.

Though each of the devices in the system 900 illustrated in FIG. 9 are illustrated as separate devices, this should not be seen as limiting, and in some embodiments, one or more of the illustrated devices may be combined into a single device. For example, in some embodiments, a single device may serve as both a maestro computing device 102 and a gateway computing device 916, or as a maestro computing device 102 and a bridge computing device 908, or as all three. Likewise, in some embodiments, the functionality of a maestro computing device 102 may be incorporated into a device that also operates as a node computing device 106.

While illustrative embodiments have been illustrated and described, it will be appreciated that various changes can be made therein without departing from the spirit and scope of the invention.

EXAMPLES

The following paragraphs provide a set of non-limiting example embodiments of the present disclosure.

Example 1. A computer-implemented method of communicating on a shared medium, the method comprising: receiving, by a node computing device, an incoming message via the shared medium; determining, based on the incoming message, whether the node computing device is the next computing device assigned to transmit on the shared medium; and in response to determining that the node computing device is the next computing device assigned to transmit via the shared medium: detecting, by the node computing device, an end of the incoming message; and in response to detecting the end of the incoming message, transmitting, by the node computing device, an outgoing message via the shared medium.

Example 2. The computer-implemented method of Example 1, wherein determining, based on the incoming message, whether the node computing device is the next computing device assigned to transmit on the shared medium includes: extracting, by the node computing device, at least one of a next node value or a next topic value from the incoming message; and determining, by the node computing device, whether the at least one of the next node value or the next topic value matches a value assigned to the node computing device.

Example 3. The computer-implemented method of Example 1, wherein determining, based on the incoming message, whether the node computing device is the next computing device assigned to transmit on the shared medium includes: incrementing, by the node computing device, a slot counter in response to receiving a start of the incoming message; and determining, by the node computing device, whether the slot counter indicates that a message slot assigned to the node computing device has been reached.

Example 4. The computer-implemented method of any one of Examples 1-3, wherein detecting the end of the incoming message includes: extracting, by the node computing device, an incoming message length value from the incoming message; counting, by the node computing device, a number of values received in the incoming message; and comparing, by the node computing device, the number of values received to the incoming message length value.

Example 5. The computer-implemented method of any one of Examples 1-4, wherein transmitting the outgoing message via the shared medium includes: determining, by the node computing device, a value for indicating a next computing device to transmit a subsequent message after the outgoing message; and adding, by the node computing device, the value for indicating the next computing device to the outgoing message; wherein the value for indicating the next computing device is a node identifier value of the next computing device or an outgoing topic identifier value assigned to the next computing device.

Example 6. The computer-implemented method of any one of Examples 1-5, wherein transmitting the outgoing message via the shared medium includes: adding, by the node computing device, an outgoing topic identifier value assigned to the node computing device to the outgoing message.

Example 7. The computer-implemented method of any one of Examples 1-6, further comprising: extracting, by the node computing device, an incoming topic identifier value from the incoming message; and in response to determining that the node computing device is subscribed to a topic identified by the incoming topic identifier value, processing, by the node computing device, a payload of the incoming message.

Example 8. A computer-implemented method of managing communication between node computing devices of a set of node computing devices communicatively coupled to a shared medium, the method comprising: transmitting, by a maestro computing device, one or more configuration messages to establish a transmission order for the set of node computing devices to transmit messages on the shared medium; and transmitting, by the maestro computing device, a start message that initiates the transmission order for the set of node computing devices.

Example 9. The computer-implemented method of Example 8, wherein each configuration message identifies a node computing device of the set of node computing devices and provides at least one of: a next node value to be used in outgoing messages by the identified node computing device; a next topic value to be used in outgoing messages by the identified node computing device; or a message slot assigned to the node computing device.

Example 10. The computer-implemented method of Example 8 or 9, further comprising: detecting, by the maestro computing device, an end of an incoming message transmitted by a node computing device of the set of node computing devices; and in response to determining that a period of time that has elapsed after the end of the incoming message without detecting a subsequent incoming message is greater than a timeout threshold period of time: performing one or more corrective actions to reset communication on the shared medium.

Example 11. The computer-implemented method of claim 10, wherein the one or more corrective actions to reset communication on the shared medium include retransmitting the start message.

Example 12. The computer-implemented method of claim 10, wherein the one or more corrective actions to reset communication on the shared medium include: determining, by the maestro computing device based on the incoming message, a failed node computing device that should have transmitted a subsequent message; and transmitting, by the maestro computing device, one or more reconfiguration messages, wherein the one or more reconfiguration messages remove the failed node computing device from the transmission order.

Example 13. The computer-implemented method of any one of Examples 8-12, further comprising: determining, by the maestro computing device, that the maestro computing device is the next computing device assigned to transmit on the shared medium; and transmitting, by the maestro computing device, one or more reconfiguration messages to change the transmission order.

Example 14. The computer-implemented method of any one of Examples 8-13, wherein the one or more configuration messages include at least one configuration message that assigns an incoming topic identifier value or an outgoing topic identifier value to an identified node computing device.

Example 15. A system for communication via a shared medium, the system comprising: a shared medium; a maestro computing device communicatively coupled to the shared medium; and a set of node computing devices that are each communicatively coupled to the shared medium, including a first node computing device of a transmission order for the set of node computing devices to transmit messages on the shared medium; wherein the maestro computing device is configured to transmit a start message via the shared medium, wherein the start message initiates the transmission order; and wherein the first node computing device is configured to: receive the start message via the shared medium; and in response to detecting an end of the start message, transmit an outgoing message via the shared medium.

Example 16. The system of Example 15, wherein the shared medium is a first shared medium, and wherein the system further comprises: a second shared medium that is communicatively isolated from the first shared medium; a second maestro computing device communicatively coupled to the second shared medium; and a bridge computing device that is communicatively coupled to both the first shared medium and the second shared medium; wherein the bridge computing device is configured to receive messages from the first shared medium and retransmit the messages to the second shared medium.

Example 17. The system of Example 15 or 16, further comprising: a gateway computing device communicatively coupled to the shared medium; wherein the gateway computing device is configured to transmit messages received via the shared medium to a network having a different architecture.

Example 18. The system of any one of Examples 15-17, wherein the shared medium includes at least one of a two-wire bidirectional LVDS medium with a fixed frequency; a two-wire bidirectional LVDS medium with a preamble for clock recovery, a two-plus-two wire bidirectional medium with a data pair and a clock pair, a four-wire unidirectional LVDS medium with a fixed frequency, or a four-plus-four wire unidirectional medium with an incoming data pair, an outgoing data pair, an incoming clock pair, and an outgoing clock pair.

Example 19. The system of any one of Examples 15-18, wherein each node computing device is configured to: receive a configuration message from the maestro computing device that assigns a node identifier to the node computing device; and store the node identifier for comparison to next node values in messages transmitted on the shared medium.

Example 20. The system of any one of Examples 15-19, wherein each node computing device has stored thereon at least one of a node identifier value for comparison to next node values or a topic identifier value for comparison to topic identifier values in messages transmitted on the shared medium prior to being communicatively coupled to the maestro computing device.

Example 21. A non-transitory computer-readable medium having computer-executable instructions stored thereon that, in response to execution by one or more processors of a node computing device, cause the node computing device to perform actions of a method as recited in any one of Examples 1-7.

Example 22. A node computing device configured to perform actions of a method as recited in any one of Examples 1-7.

Example 23. A device including circuitry configured to perform actions of a method as recited in any one of Examples 1-7.

Example 24. A non-transitory computer-readable medium having computer-executable instructions stored thereon that, in response to execution by one or more processors of a maestro computing device, cause the maestro computing device to perform actions of a method as recited in any one of Examples 8-14.

Example 25. A maestro computing device configured to perform actions of a method as recited in any one of Examples 8-14.

Example 26. A device including circuitry configured to perform actions of a method as recited in any one of Examples 8-14.

The embodiments of the invention in which an exclusive property or privilege is claimed are defined as follows:

1. A computer-implemented method of communicating on a shared medium, the method comprising:

receiving, by a node computing device, an incoming message via the shared medium;

determining, based on the incoming message, whether the node computing device is a next computing device assigned to transmit on the shared medium; and in response to determining that the node computing device is the next computing device assigned to transmit via the shared medium:

detecting, by the node computing device, an end of the incoming message; and in response to detecting the end of the incoming message, transmitting, by the node computing device, an outgoing message via the shared medium.

2. The computer-implemented method of claim 1, wherein determining, based on the incoming message, whether the node computing device is the next computing device assigned to transmit on the shared medium includes:

extracting, by the node computing device, at least one of a next node value or a next topic value from the incoming message; and determining, by the node computing device, whether the at least one of the next node value or the next topic value matches a value assigned to the node computing device.

3. The computer-implemented method of claim 1, wherein determining, based on the incoming message, whether the node computing device is the next computing device assigned to transmit on the shared medium includes:

incrementing, by the node computing device, a slot counter in response to receiving a start of the incoming message; and determining, by the node computing device, whether the slot counter indicates that a message slot assigned to the node computing device has been reached.

4. The computer-implemented method of claim 1, wherein detecting the end of the incoming message includes:

extracting, by the node computing device, an incoming message length value from the incoming message;

counting, by the node computing device, a number of values received in the incoming message; and comparing, by the node computing device, the number of values received to the incoming message length value.

5. The computer-implemented method of claim 1, wherein transmitting the outgoing message via the shared medium includes:

determining, by the node computing device, a value for indicating the next computing device to transmit a subsequent message after the outgoing message; and adding, by the node computing device, the value for indicating the next computing device to the outgoing message;

wherein the value for indicating the next computing device is a node identifier value of the next computing device or an outgoing topic identifier value assigned to the next computing device.

6. The computer-implemented method of claim 1, wherein transmitting the outgoing message via the shared medium includes:

adding, by the node computing device, an outgoing topic identifier value assigned to the node computing device to the outgoing message.

7. The computer-implemented method of claim 1, further comprising:

extracting, by the node computing device, an incoming topic identifier value from the incoming message; and in response to determining that the node computing device is subscribed to a topic identified by the incoming topic identifier value, processing, by the node computing device, a payload of the incoming message.

8. A computer-implemented method of managing communication between node computing devices of a set of node computing devices communicatively coupled to a shared medium, the method comprising:

transmitting, by a maestro computing device, one or more configuration messages to establish a transmission order for the set of node computing devices to transmit messages on the shared medium, wherein the one or more configuration messages include at least one configuration message that assigns an incoming topic identifier value or an outgoing topic identifier value to an identified node computing device; and transmitting, by the maestro computing device, a start message that initiates the transmission order for the set of node computing devices.

9. The computer-implemented method of claim 8, wherein each configuration message identifies a node computing device of the set of node computing devices and provides at least one of:

a next node value to be used in outgoing messages by the identified node computing device;

a next topic value to be used in the outgoing messages by the identified node computing device; or a message slot assigned to the node computing device.

10. The computer-implemented method of claim 8, further comprising:

detecting, by the maestro computing device, an end of an incoming message transmitted by a node computing device of the set of node computing devices; and in response to determining that a period of time that has elapsed after the end of the incoming message without detecting a subsequent incoming message is greater than a timeout threshold period of time:

performing one or more corrective actions to reset communication on the shared medium.

11. The computer-implemented method of claim 10, wherein the one or more corrective actions to reset communication on the shared medium include retransmitting the start message.

12. The computer-implemented method of claim 10, wherein the one or more corrective actions to reset communication on the shared medium include:

determining, by the maestro computing device based on the incoming message, a failed node computing device that should have transmitted a subsequent message; and transmitting, by the maestro computing device, one or more reconfiguration messages, wherein the one or more reconfiguration messages remove the failed node computing device from the transmission order.

13. The computer-implemented method of claim 8, further comprising:

determining, by the maestro computing device, that the maestro computing device is a next computing device assigned to transmit on the shared medium; and transmitting, by the maestro computing device, one or more reconfiguration messages to change the transmission order.

14. A system for communication via a shared medium, the system comprising:

a shared medium;

a maestro computing device communicatively coupled to the shared medium; and a set of node computing devices that are each communicatively coupled to the shared medium, including a first node computing device of a transmission order for the set of node computing devices to transmit messages on the shared medium;

wherein the maestro computing device is configured to transmit a start message via the shared medium, wherein the start message initiates the transmission order; and wherein the first node computing device is configured to:

receive the start message via the shared medium; and in response to detecting an end of the start message, transmit an outgoing message via the shared medium.

15. The system of claim 14, wherein the shared medium is a first shared medium, and wherein the system further comprises:

a second shared medium that is communicatively isolated from the first shared medium;

a second maestro computing device communicatively coupled to the second shared medium; and a bridge computing device that is communicatively coupled to both the first shared medium and the second shared medium;

wherein the bridge computing device is configured to receive messages from the first shared medium and retransmit the messages to the second shared medium.

16. The system of claim 14, further comprising:

a gateway computing device communicatively coupled to the shared medium;

wherein the gateway computing device is configured to transmit messages received via the shared medium to a network having a different architecture.

17. The system of claim 14, wherein the shared medium includes at least one of a two-wire bidirectional LVDS medium with a fixed frequency; a two-wire bidirectional LVDS medium with a preamble for clock recovery, a two-plus-two wire bidirectional medium with a data pair and a clock pair, a four-wire unidirectional LVDS medium with a fixed frequency, or a four-plus-four wire unidirectional medium with an incoming data pair, an outgoing data pair, an incoming clock pair, and an outgoing clock pair.

18. The system of claim 14, wherein each node computing device is configured to:

receive a configuration message from the maestro computing device that assigns a node identifier to the node computing device; and store the node identifier for comparison to next node values in messages transmitted on the shared medium.

19. The system of claim 14, wherein each node computing device has stored thereon at least one of a node identifier value for comparison to next node values or a topic identifier value for comparison to topic identifier values in messages transmitted on the shared medium prior to being communicatively coupled to the maestro computing device.

\* \* \* \* \*